United States Patent [19]

Wakabayashi

[11] Patent Number: 5,364,469

[45] Date of Patent: Nov. 15, 1994

[54] HANGER FOR USE IN CONVEYORS

[75] Inventor: Takao Wakabayashi, Osaka, Japan

[73] Assignee: Nakanishi Metal Works Co. Ltd., Osaka, Japan

[21] Appl. No.: 7,127

[22] Filed: Jan. 21, 1993

[30] Foreign Application Priority Data

Jan. 21, 1992 [JP] Japan ................... 4-008737
Jul. 24, 1992 [JP] Japan ............... 4-052220[U]

[51] Int. Cl.⁵ ............................................. C25D 17/06
[52] U.S. Cl. ................................... 118/423; 118/500; 198/474.1; 198/465.4
[58] Field of Search ............... 118/423, 500; 198/346.3, 474.1, 465.4, 802

[56] References Cited

U.S. PATENT DOCUMENTS

| | | | |
|---|---|---|---|
| 2,678,025 | 5/1954 | Straky | 118/500 |
| 2,831,454 | 4/1958 | Kearney | 118/423 |
| 3,410,200 | 11/1968 | Gillet | 118/423 |
| 4,289,090 | 9/1981 | Bagby | 118/500 |
| 4,831,962 | 5/1989 | Gros | 118/423 |
| 4,904,365 | 2/1990 | Kawamura | 118/500 |

FOREIGN PATENT DOCUMENTS

| | | | |
|---|---|---|---|
| 1146788 | 4/1963 | Germany | 118/423 |
| 1556118 | 7/1971 | Germany . | |
| 3612128 | 10/1986 | Germany . | |
| 3640797 | 6/1988 | Germany . | |
| 1395383 | 1/1975 | United Kingdom | 118/423 |

Primary Examiner—W. Gary Jones
Assistant Examiner—John Hoffmann
Attorney, Agent, or Firm—Armstrong, Westerman, Hattori, McLeland & Naughton

[57] ABSTRACT

A hanger for use in conveyors comprises an upper frame suspendable from a free trolley, a lower frame for loading thereon the article to be transported, and a pair of front and rear arms interconnecting the upper and lower frames and so inclined as to approach each other as the arms extend toward lower ends thereof. The arms have upper ends pivotably connected to the upper frame and have their lower ends pivotably connected to the lower frame. The front and rear arms, the portion of the upper frame between the arm upper ends and the portion of the lower frame between the arm lower ends are connected together in the form of a trapezoid which is shorter at its lower side than at its upper side when seen from one side with the upper and lower frames in a horizontal state. The article, such as a vehicle body, being transported can be plunged into or withdrawn from the bath of an electrodeposition tank in a coating line at a predetermined large angle without giving a large angle of inclination to a free rail.

11 Claims, 12 Drawing Sheets

HANGER FOR USE IN CONVEYORS

BACKGROUND OF THE INVENTION

The present invention relates to hangers for conveyors, for example, for use in coating lines for motor vehicle bodies.

In conventional coating lines comprising an overhead trolley conveyor for the electrodeposition coating of motor vehicle bodies, the vehicle body while being transported is guided into the bath of an electrodeposition tank so as to obliquely plunge thereinto and is obliquely withdrawn from the bath. This prevents the vehicle body from floating up with smooth discharge of air from inside the body when it is immersed into the bath, and further permits the electrodeposition bath to smoothly flow out from inside the body when it is withdrawn from the bath. In this case, it is practice to determine by experiments the optimum angle at which the vehicle body is to be plunged into the electrodeposition bath and the optimum angle at which the vehicle body is to be withdrawn from the bath.

The carrier of the conventional trolley conveyor has a hanger which comprises an upper frame suspended from a free trolley, a lower frame for loading thereon the vehicle body to be transported, and a pair of front and rear arms interconnecting the upper and lower frames. However, since the front and rear two arms extend vertically in parallel to each other, there is a need to give a large angle of inclination to the free rail at the location where the vehicle body is to be obliquely plunged into the electrodeposition bath. Otherwise, the vehicle body can not be guided into and withdrawn from the bath at a predetermined large angle. Thus, it is not easy to design the conveyor line.

To overcome this problem, we have conducted continued research and proposed a hanger rocking device having side rollers and provided on the carrier, and a guide rail disposed below the free rail and having a large angle of inclination at the location where the vehicle body is plunged into or withdrawn from the electrodeposition bath to cause the inclined portion of the guide rail to guide the side rollers of the hanger rocking device and obtain a large angle at which the vehicle body is to be plunged into or withdrawn from the bath (see, for example, Unexamined Japanese Utility Model Publication HEI 3-69567). However, the proposal has the problem of an increased equipment cost because of the necessity of providing the roller-equipped rocking device on the carrier and installing the guide rail in combination with the free rail for guiding the side rollers.

SUMMARY OF THE INVENTION

The main object of the present invention is to provide a hanger free of the above problems and adapted for use in conveyors.

The present invention provides a hanger for use in conveyors which is characterized in that the hanger comprises an upper frame suspendable from a free trolley, a lower frame for loading thereon the article to be transported, and a pair of front and rear arms interconnecting the upper and lower frames and so inclined as to approach each other as the arms extend toward lower ends thereof, the front and rear arms having upper ends pivotably connected to the upper frame and having their lower ends pivotably connected to the lower frame, the front and rear arms, the portion of the upper frame between the arm upper ends and the portion of the lower frame between the arm lower ends being connected together in the form of a trapezoid which is shorter at its lower side than at its upper side when seen from one side with the upper and lower frames in a horizontal state.

The front and rear two arms of the hanger have longitudinal portions which are inclined at an angle of 0.5 to 5 degrees, preferably 1.5 to 4.0 degrees, from a direction perpendicular to the upper frame in the horizontal state so as to approach each other as they extend toward their lower ends.

The hanger is preferably in the form of an isosceles trapezoid but need not always be limited to this shape insofar as the longitudinal portion of at least the front arm of the hanger is inclined at an angle of 0.5 to 5 degrees, preferably 1.5 to 4.0 degrees, inward, i.e., rearward, from a direction perpendicular to the upper frame in the horizontal state as the longitudinal portion extends toward the lower end thereof.

In the case where the hanger of the present invention is used in the trolley conveyor of a coating line for motor vehicle bodies, a forwardly downward slope portion having an angle of 22 to 27 degrees is formed in the free rail of the conveyor at the portion thereof corresponding to the inlet of the electrodeposition tank so that the vehicle body being transported is plunged obliquely into the bath of the tank. Furthermore, a forwardly upward slope portion similarly having an angle of 22 to 27 degrees is formed in the free rail at the portion thereof corresponding to the outlet of the electrodeposition tank so that the vehicle body being transported is withdrawn from the bath obliquely.

Thus, the longitudinal portion of at least the front arm of the hanger is inclined at an angle of 0.5 to 5 degrees rearward from a direction perpendicular to the upper frame in the horizontal state as the arm portion extends toward the lower end, and the forwardly downward slope portion having an angle of 22 to 27 degrees is formed in the free rail at the portion thereof corresponding to the electrodeposition tank inlet, whereby the vehicle body being transported can be guided into the bath of the electrodeposition tank so as to obliquely plunge into the bath forwardly downward at an optimum angle of 38 to 42 degrees. This reliably releases air from inside the vehicle body to assure the vehicle body of a perfect coating operation.

Similarly, the forwardly upward slope portion having an angle of 22 to 27 degrees is provided in the free rail at the portion thereof corresponding to the outlet of the electrodeposition tank, whereby the vehicle body being transported can be obliquely withdrawn from the bath of the tank rearwardly upward at an optimum angle of 38 to 42 degrees while permitting the bath to promptly flow out from inside the vehicle body.

The angle of inclination of the free rail itself is not made greater than the range of 22 to 27 degrees as stated above, and yet the vehicle body can be plunged into or withdrawn from the bath at an angle as large as 38 to 42 degrees. The conveyor line, especially the free line, can therefore be designed with ease.

Moreover, the carrier need not be provided with the conventional hanger rocking device having side rollers for guiding the vehicle body into and out of the electrodeposition tank, nor is it necessary to install a guide rail for guiding the side rollers. This makes the conveyor simple in construction to result in a reduced equipment cost.

The present invention will be described in greater detail with reference to the accompanying drawings.

DESCRIPTION OF THE PREFERRED EMBODIMENTS

Throughout the drawings, like parts are designated by like reference numerals.

The term "front" as used herein refers to the direction in which the article to be transported by the trolley conveyor advances, the term "rear" to a direction opposite to this direction, and the terms "right" and "left" are used for the conveyor as seen toward the front.

Figure 1:
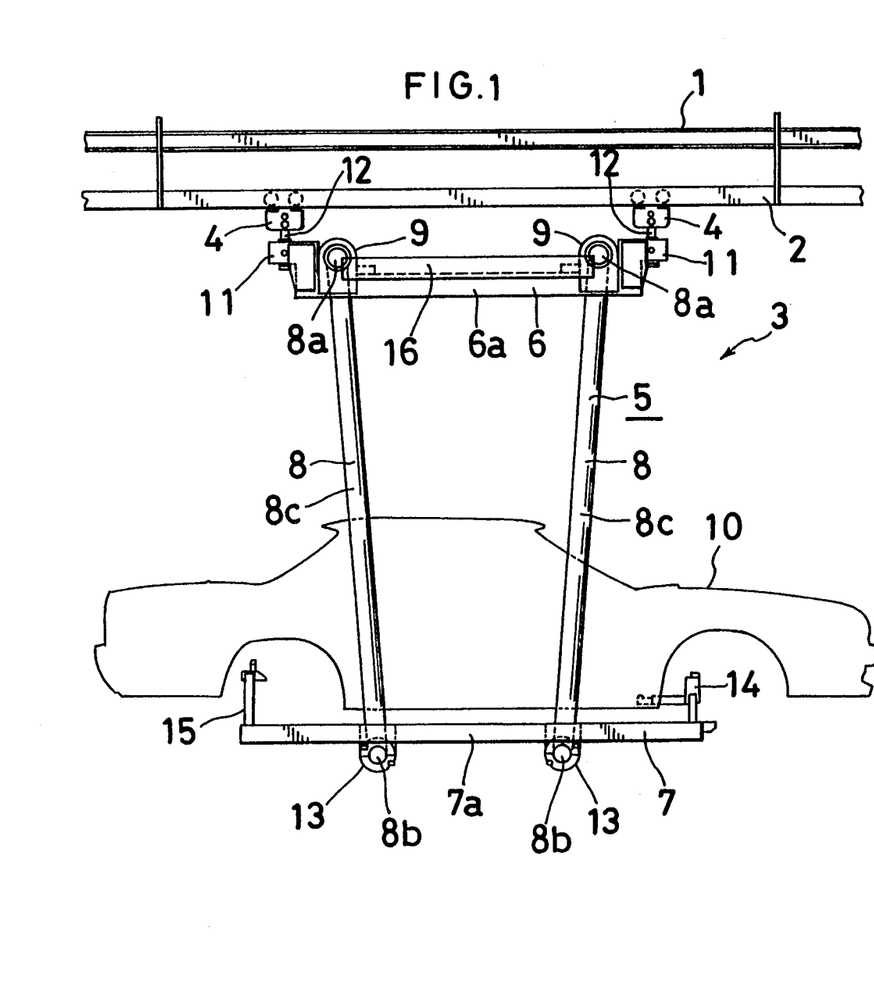
FIG. 1 is a fragmentary side elevation showing a first embodiment of the invention, i.e., a trolley coneyor having hangers.
Figure 2:
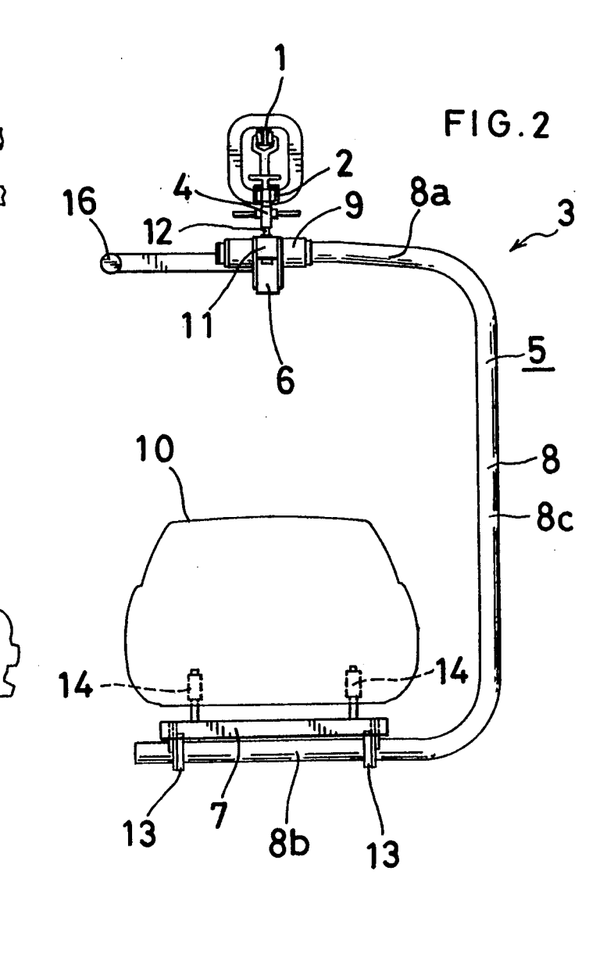
FIG. 2 is a front view of the same.
Figure 3:
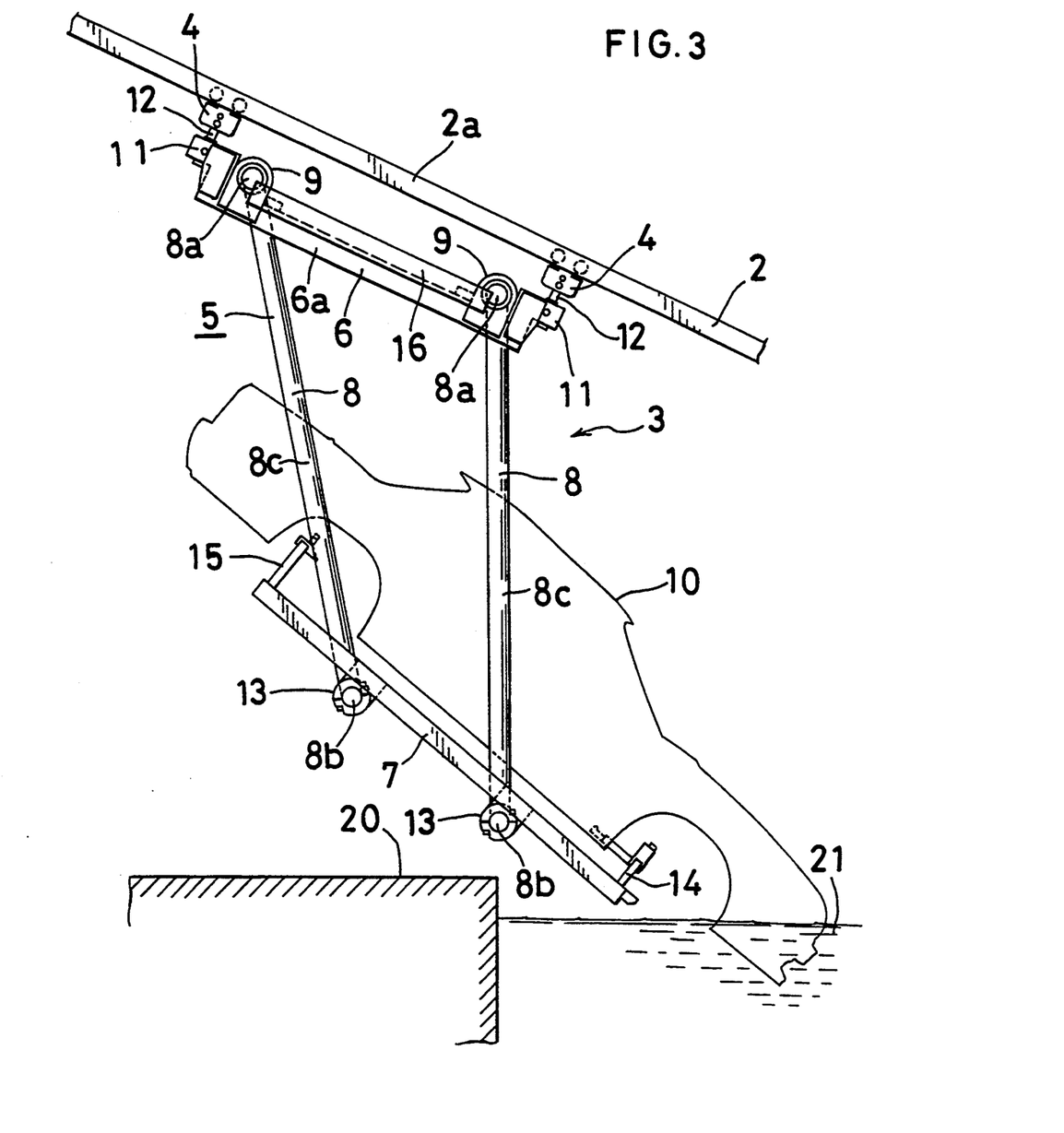
FIG. 3 is a side elevation showing a vehicle body while it is being guided into the bath of an electrodeposition tank during transport in a coating process with use of the hanger-equipped trolley conveyor of the first embodiment.

FIGS. 1 to 3 show an embodiment comprising a hanger of the invention as incorporated in a power-and-free overhead trolley conveyor for use in motor vehicle coating lines.

With reference to FIGS. 1 and 2, the trolley conveyor comprises a power rail 1 made of I-steel, and a free rail 2 composed of a pair of right and left channel steel members and disposed in parallel to the power rail 1. Carriers 3 movable on the free rail 2 each comprise a pair of front and rear free trolleys 4, 4, and a hanger 5 of the invention suspended therefrom.

The hanger 5 comprises an upper frame 6, a lower frame 7 for loading thereon the article to be transported, and a pair of front and rear arms 8, 8 interconnecting the upper and lower frames 6, 7 and so inclined as to approach each other as they extend toward their lower ends, the arms being U-shaped generally when seen from the front.

Each of the front and rear arms 8, 8 has an upper-end horizontal portion 8a which is pivotably connected by a bearing bracket 9 to the upper frame 6 at a portion thereof close to its front or rear end. The front and rear ends of the upper frame 6 are provided respectively with inverted L-shaped projections 11, 11, which are connected to the respective free trolleys 4, 4 by vertical rods 12, 12.

Each of the front and rear arms 8, 8 has a lower-end horizontal portion 8b pivotably connected to an intermediate portion of the lower frame 7 by a bearing bracket 13. The front and rear arms 8, 8 each have a longitudinal portion 8c, the upper frame 6 has a portion 6a between the upper-end horizontal portions 8a, 8a of the two arms 8, 8, and the lower frame 7 includes a portion 7a between the lower-end horizontal portions 8b, 8b of the two arms 8, 8. Consequently, the arm longitudinal portions 8c, 8c, the upper frame portion 6a and the lower frame portion 7a of the hanger 5 are interconnected in the form of an isosceles trapezoid which is shorter at its lower side than at its upper side when seen from one side with the upper and lower two frames 6, 7 positioned in a horizontal state.

The longitudinal portions 8c, 8c of the pair of front and rear arms 8, 8 of the hanger 5 are inclined at an angle of 3.0 degrees from a direction perpendicular to the upper frame 6 in the horizontal state so as to approach each other as they extend toward their lower ends. The hanger 5 is in the form of an isosceles trapezoid when seen from one side.

The hanger 5 need not always be in the form of an isosceles trapezoid insofar as the longitudinal portion 8c of at least the front arm 8 of the hanger 5 is inclined at an angle of 0.5 to 5 degrees, preferably 1.5 to 4.0 degrees, inward, i.e., rearward, from a direction perpendicular to the upper frame 6 in the horizontal state as the portion 8c extends toward the arm lower end.

Incidentally, the angle of inclination of these arms 8 differs also with the length of the arm longitudinal portions 8c or with the length of the article 10 to be transported, and can be larger than the above-mentioned angle.

The article 10, which is the body of a motor vehicle, is transported as placed on the lower frame 7 of the hanger 5 of the carrier 3 by means of a pair of front and rear attaching members 14, 15.

According to the present invention as seen in FIG. 3, a forwardly downward slope portion 2a having an angle, for example, of 25 degrees is formed in the free rail 2 at the portion thereof corresponding to the inlet of an electrodeposition tank 20 in the coating line so that the vehicle body 10 being transported is plunged into a bath 21 in the tank 20. Although not shown, the portion of the free rail above the electrodeposition tank 20 is horizontal, and a forwardly upward slope portion similarly having an angle of 25 degrees is formed in the free rail 2 at the portion thereof corresponding to the outlet of the electrodeposition tank 20 so that the vehicle body 10 being transported is obliquely withdrawn from the bath 21 of the tank 20.

When the body 10 of a motor vehicle is transported as placed on the hanger 5 of the carrier 3 onto the coating line, the free trolleys 4, 4 are guided by the forwardly downward slope portion 2a of the free rail 2 having an angle of 25 degrees at the inlet portion of the electrodeposition tank 20. According to the present invention, the pair of front and rear arms 8, 8 of the hanger 5 are so inclined as to approach each other toward their lower ends, and the longitudinal portions 8c, 8c of the front and rear arms 8, 8, the upper frame portion 6a and the lower frame portion 7a are connected together in the form of an isosceles trapezoid in which the lower side is shorter than the upper side when seen from one side. As a result, the vehicle body 10 is guided into the bath 21 of the tank 20 so as to plunge thereinto at an optimum angle, for example, of 40 degrees. This reliably discharges air from inside the vehicle body 10, assuring the vehicle body 10 of a perfect coating operation.

Further although not shown, the vehicle body 10 is obliquely withdrawn forwardly upward from the bath 21 of the tank 20 similarly at an optimum angle of 40 degrees, permitting the bath 21 to promptly flow out from inside the vehicle body.

The angle of inclination of the free rail 2 itself is 25 degrees and is not greater than this angle, whereas the vehicle body can be plunged into or withdrawn from the bath at an angle as large as 40 degrees. This makes the conveyor line, especially the free rail 2, easy to design.

The upper frame 6 of the hanger 5 is provided with an outwardly extending balance weight 16. Although not shown in detail, a drive chain is guided by the power rail 1 by means of rollers, and the chain has pushers arranged at a predetermined spacing, projecting therefrom downward and each having a hooked end. The free trolleys 4, 4 of the carrier 3 suspended from the free rail 2 have a tilting dog and an accumulating cam.

Figure 4:
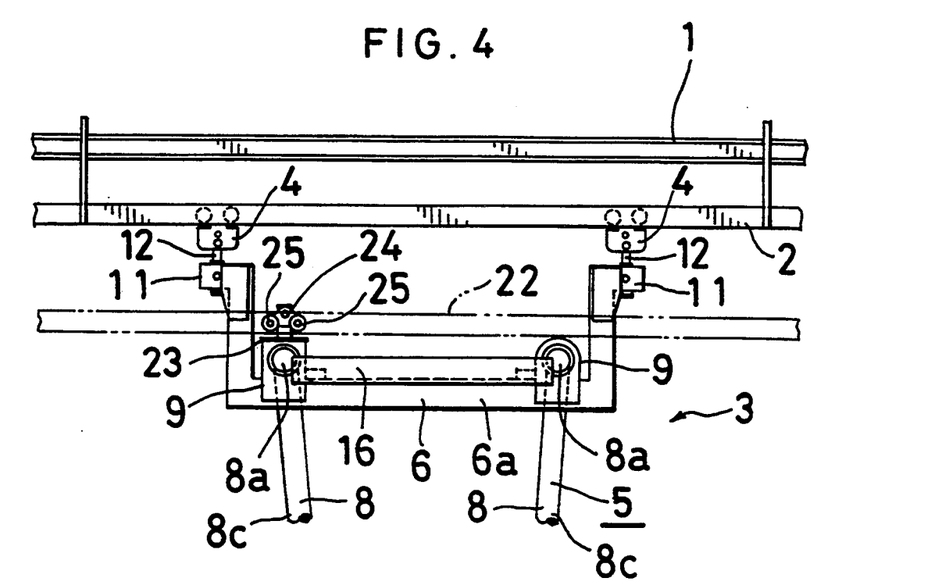
FIG. 4 is a fragmentary side elevation showing a trolley conveyor as a second embodiment of the invention.
Figure 5:
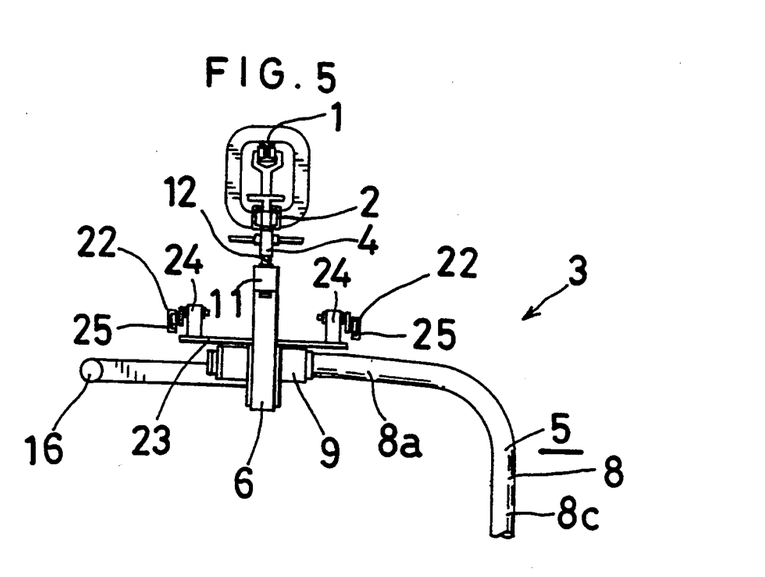
FIG. 5 is a front view of the same.
Figure 6:
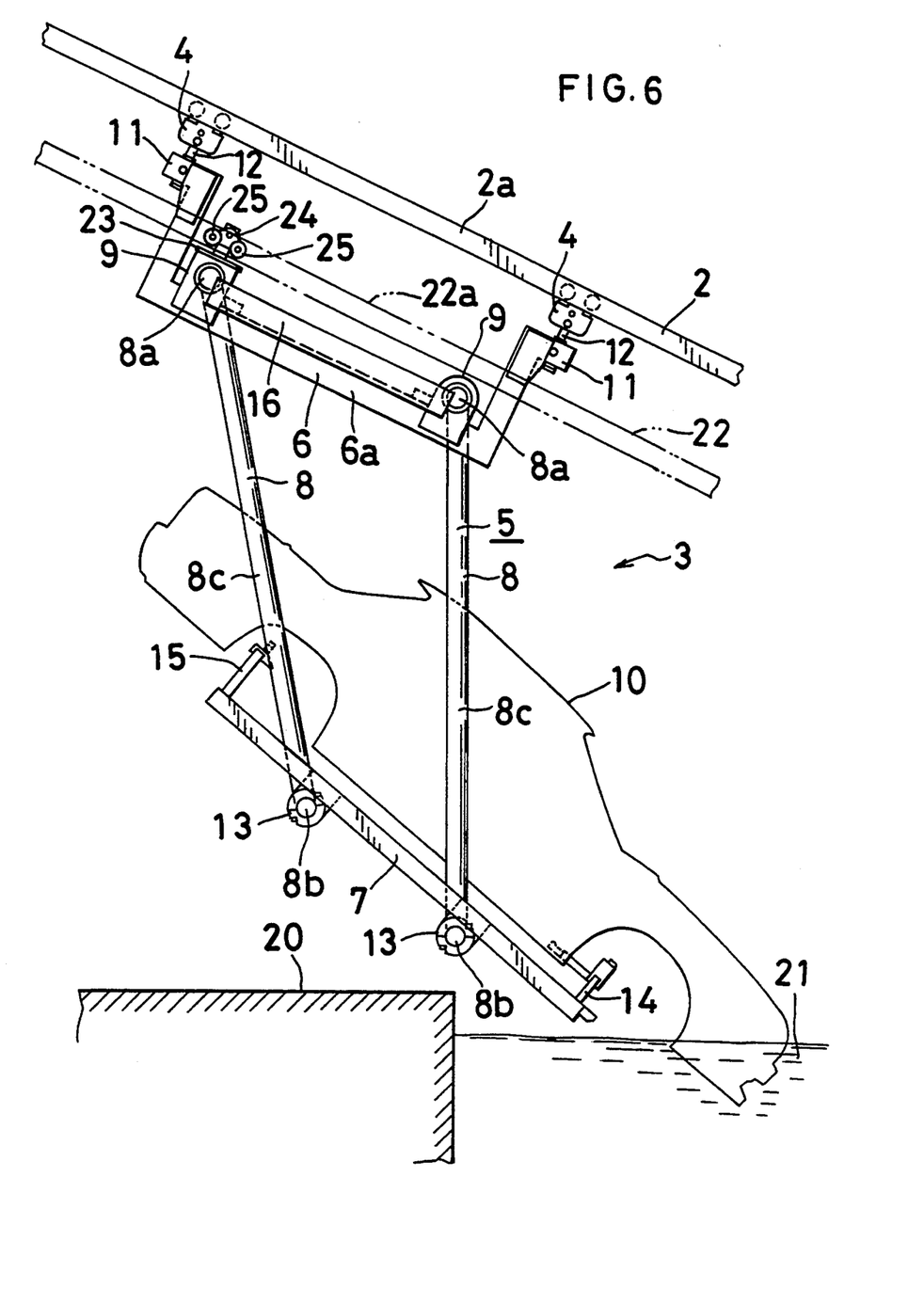
FIG. 6 is a side elevation showing a vehicle body while it is being guided into the bath of an electrodeposition tank during transport in a coating process with use of the trolley conveyor of the second embodiment.

FIGS. 4 to 6 show another embodiment of the present invention.

This embodiment differs from the first embodiment in that the embodiment has pairs of right and left guide rollers 25, 25 and guide rails 22 for guiding these rollers. These rollers serve to prevent the hanger 5 and the vehicle body 10 from retracting against a resisting force offered to the body 10, for example, by an increased speed of the carrier 3 when the vehicle body 10 is guided into or withdrawn from the bath 21 of the electrodeposition tank 20.

Stated more specifically, a pair of guide rails 22 is provided in parallel to the free rail 2 at the location where the vehicle body 10 is guided into the electrodeposition tank 20. At this location, the guide rails 22 each have a forwardly downward slope portion 22a in parallel to the forwardly downward slope portion 2a of the free rail 2. At the location where the vehicle body 10 is withdrawn from the tank 20, guide rails (not shown) are disposed in parallel to the forwardly upward slope portion of the free rail 2. A transverse mount plate 23 extends horizontally, and is connected, between bearing brackets 9, 9 provided on the hanger upper frame 6 at a portion thereof close to its rear end. In corresponding relation with each guide rail 22, a pair of front and rear side rollers 25, 25 is mounted by a holding member 24 on each of the right and left ends of the mount plate 23. When the vehicle body 10 is guided into or withdrawn from the tank 20, these side rollers 25, 25 are guided by the slope portions 22a of the guide rails 22. Owing to the presence of the side rollers 25, 25 on the hanger 5 and the guide rails 22, the vehicle body 10 can be guided into and out of the bath 21 of the tank 20 reliably even at an increased speed.

The second embodiment has the same construction as the first embodiment with exception of the above feature.

With the second embodiment, the guide rails 22 are arranged at the respective sides of the free rail 2, and the right and left pairs of front and rear side rollers 25 are guided by the respective guide rails 22. However, the guide rail 22 may be provided on at least one side of the free rail 2, and the side rollers 25 on the hanger 5 may be arranged on the same side as the guide rail 22.

Figure 7:
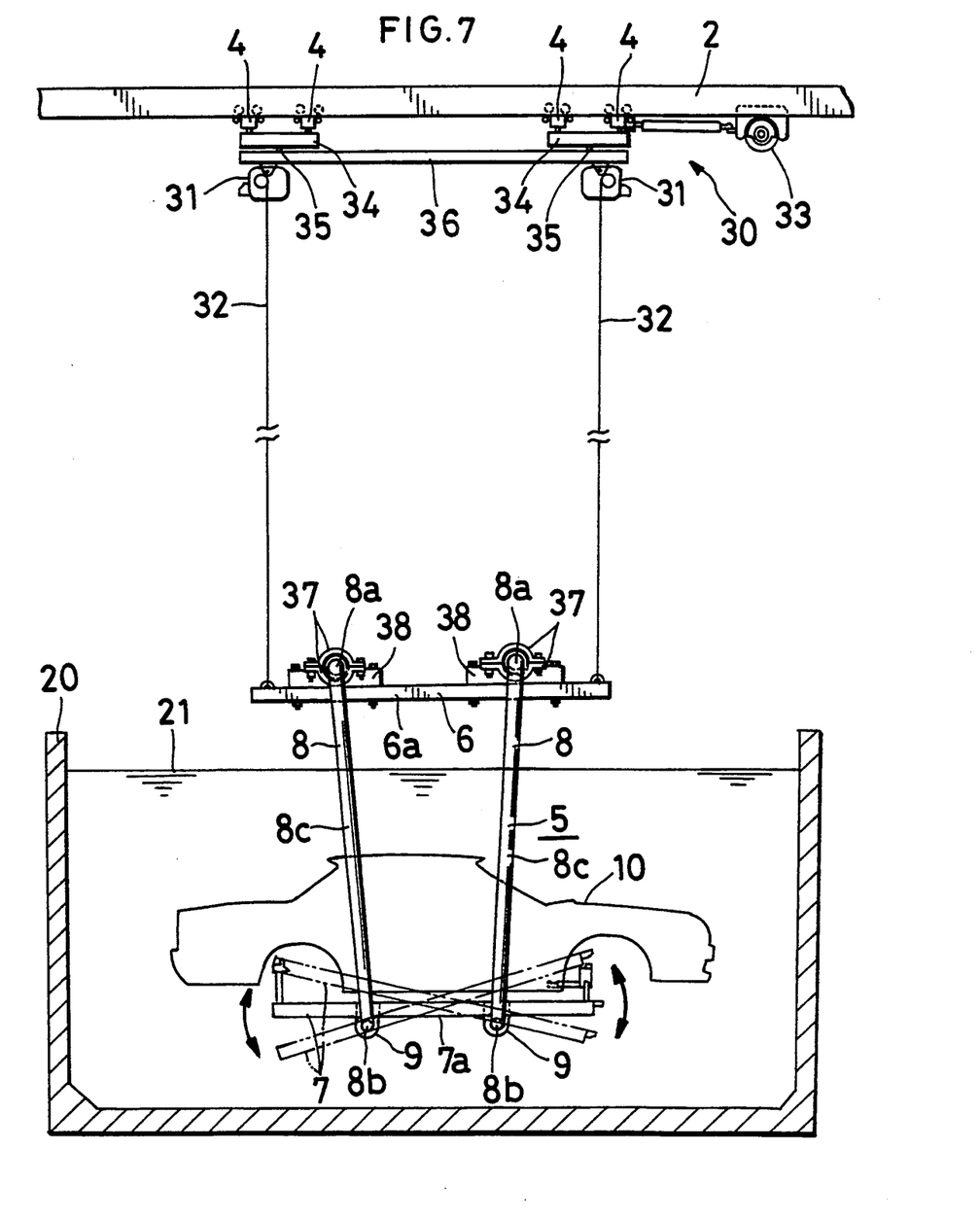
FIG. 7 is a side elevation showing a vehicle body while it is being coated with the bath of a batchwise electrodeposition tank during transport in a coating process which employs a third embodiment of the invention, i.e., a trolley conveyor of the self-propelled carrier type having hangers.
Figure 8:
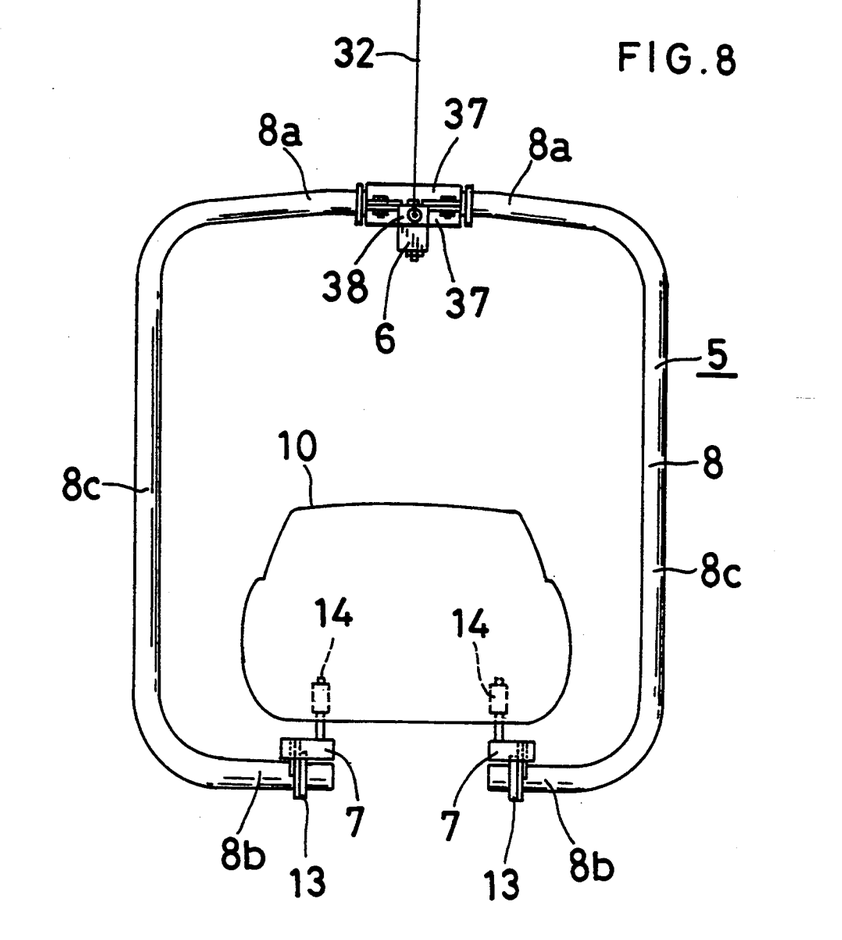
FIG. 8 is a front view of the trolley conveyor of the third embodiment.
Figure 9:
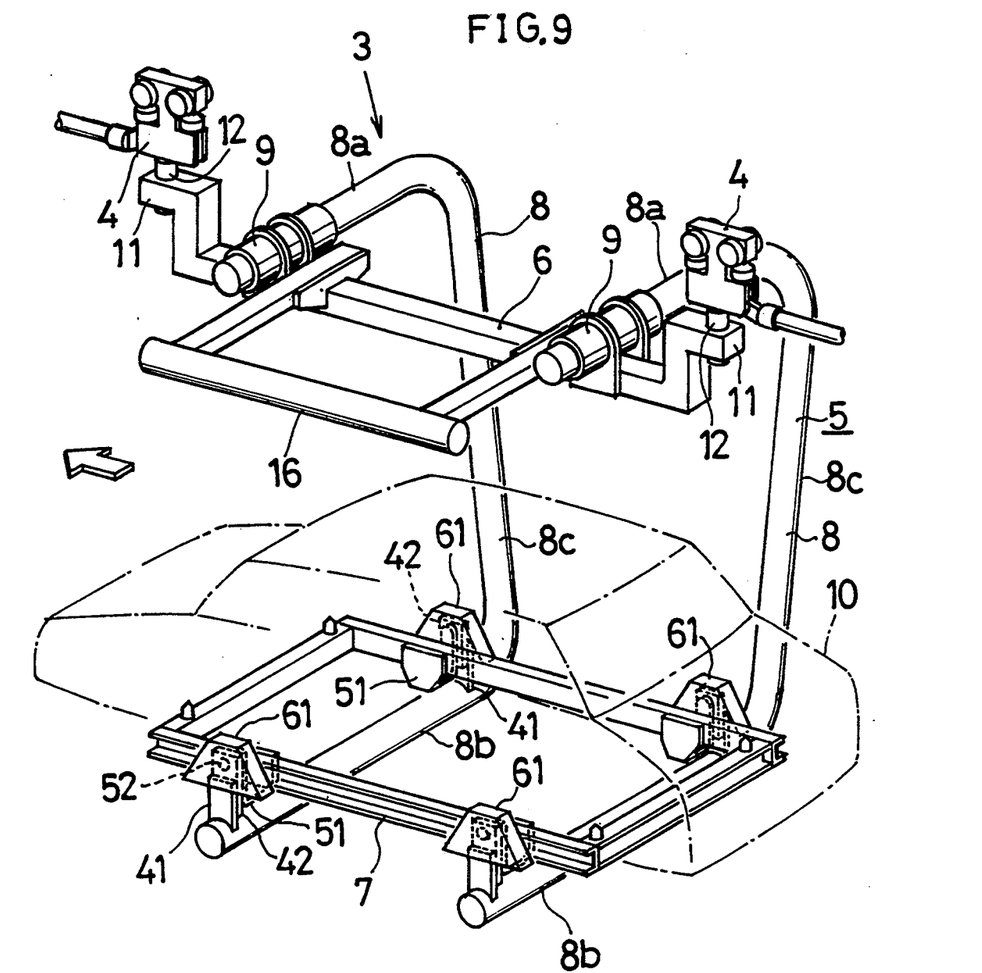
FIG. 9 is a perspective view of a hanger of fourth embodiment of the invention.
Figure 10:
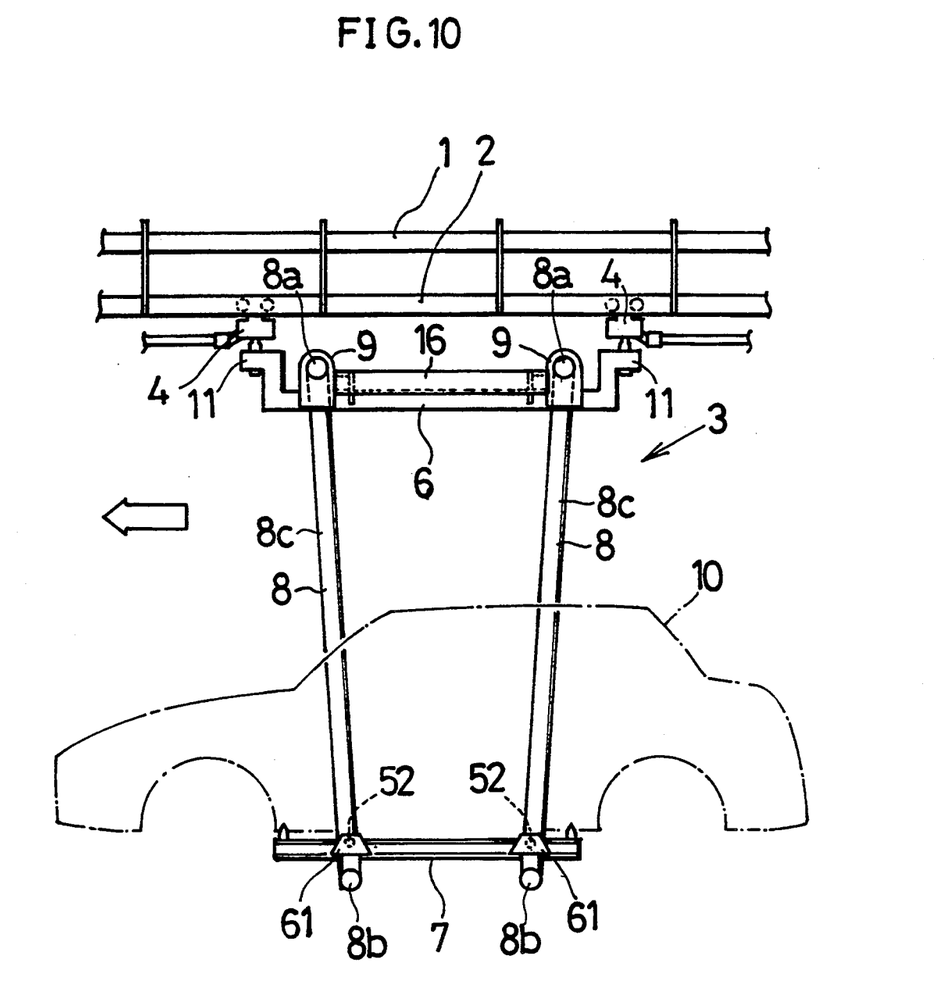
FIG. 10 is a side elevation of the hanger.

FIGS. 7 and 8 show another embodiment of the present invention.

This embodiment is different from the first embodiment in respect of the following features. A hanger 5 embodying the invention is adapted for use in a motor vehicle coating line which comprises a trolley conveyor having self-propelled carriers 30. The carrier 30 has a pair of front and rear chain hoists 31, 31, and the hanger 5 is suspended by front and rear chains 32, 32 to support a vehicle body in a forwardly downward or upward inclined position for batchwise coating. The hanger 5 has front and rear two arms which are in the form of a gate when seen from the front.

With reference to the same drawings, the self-propelled carrier 30 has an electrically driven wheel 33 at its front end, and a front pair and a rear pair of free trolleys 4, 4. The pair of free trolleys 4, 4 are interconnected by a connecting bar 34. A horizontal bar 36 is horizontally suspended from the pair of front and rear connecting bars 34, 34 by connecting rods 35, 35 respectively. The pair of chain hoists 31, 31 are attached respectively to the front and rear ends of the horizontal bar 36 on the underside thereof. The hanger 5 of the invention has an upper frame 6 the front and rear ends of which are suspended by the respective chains 32, 32 of these hoists 31, 31.

Although the hanger 5 has generally the same construction as in the case of the first embodiment described, the front and rear two arms 8, 8 resemble a gate when seen from the front, and the midportion of upper-end horizontal portion 8a of each arm 8 is pivotably connected to an intermediate portion of the upper frame 6 by a connecting member 38 having upper and lower divided sleeves 37, 37, and bolts and nuts. Each of the front and rear arms 8, 8 has a lower-end horizontal portion 8b, which is pivotably connected to an intermediate portion of a lower frame 7 by a bearing bracket 13.

Longitudinal portions 8c, 8c of the front and rear arms 8, 8, the upper frame portion 6a between the upper-end horizontal portions 8a, 8a of the two arms and the lower frame portion 7a between the lower-end horizontal portions 8b, 8b of the arms 8, 8 are connected together in the form of an isosceles trapezoid which is shorter at its lower side than at its upper side when seen from one side with the upper and lower frames 6, 7 in a horizontal state, as is the case with the first embodiment.

As shown in FIG. 7, a vehicle body 10 being transported is brought to above an electrodeposition tank 20 by the operation of the self-propelled carrier 30, whereupon the front and rear chain hoists 31, 31 are operated to pay off the front and rear chains 32, 32, lowering the hanger 5 and the vehicle body 10 placed thereon and bringing the body 10 into a bath 21 within the tank 20 from above. In this state, the chains 32, 32 of the front and rear hoists 31, 31 are alternately payed off or wound up to incline the body 10 forwardly downward or upward and to form an electrodeposition coating over the vehicle body 10 by a batchwise operation.

With the hanger 5 of the present invention, the front and rear two arms 8, 8 are so inclined as to approach each other toward their lower ends, and the two arms 8, 8 upper frame portion 6a and lower frame portion 7a are connected together in the form of an isosceles trapezoid in which the lower side is shorter than the upper side when seen from one side. As a result, the vehicle body 10 can be inclined forwardly downward or upward through a very large angle within the bath 21 the tank 20. This effectively releases air from inside the vehicle body 10, permitting the body 10 to be coated flawlessly.

With the third embodiment described, the mid-portion of upper-end horizontal portion 8a of each arm 8 which is gate-shaped is pivoted to the upper frame 6, whereas each of the right and left ends of the arm upper-end horizontal portion 8a may alternatively be hingedly (not shown) connected to the upper end of the arm longitudinal portion 8c at each side, at each shoulder portion of the gate-shaped arm 8. In this case, the midportion of upper-end horizontal portion 8a of the arm 8 is fixed to the upper frame 6.

FIGS. 9 to 14 show another embodiment of the invention.

This embodiment differs from the first embodiment in that an air-retaining cover 61 generally in the form of a box having an open bottom side is provided over a lower horizontal support pivot 52 connecting a vehicle body carrying lower frame 7 to the lower end of each of front and rear arms 8, and over a lower bearing 42 for the pivot 52.

With reference to FIGS. 9 to 12, each arm 8 has a lower-end horizontal portion 8b the forward end and base end of which each have a bracket 41 in the form of a vertical plate. The lower bearing 42 is attached to the bracket 41 and comprises a body 42a and a cap 42b.

The lower frame 7 is a rectangular assembly of shape steel members. In corresponding relation with the lower bearing 42, an approximately U-shaped bracket 51 is attached to each of four portions of the lower frame 7. The U-shaped bracket 51 comprises an inner vertical portion 51a attached to the lower frame 7, a horizontal connecting portion 51b extending horizontally outward from the lower end of the portion 51a and an outer upright portion 51c extending upward from the outer end of the connecting portion 51b. The horizontal support pivot 52 projects outward from the upper end of the outer upright portion 51c of the bracket 51 and is held between the bearing body 42a and the cap 42b.

Figure 11:
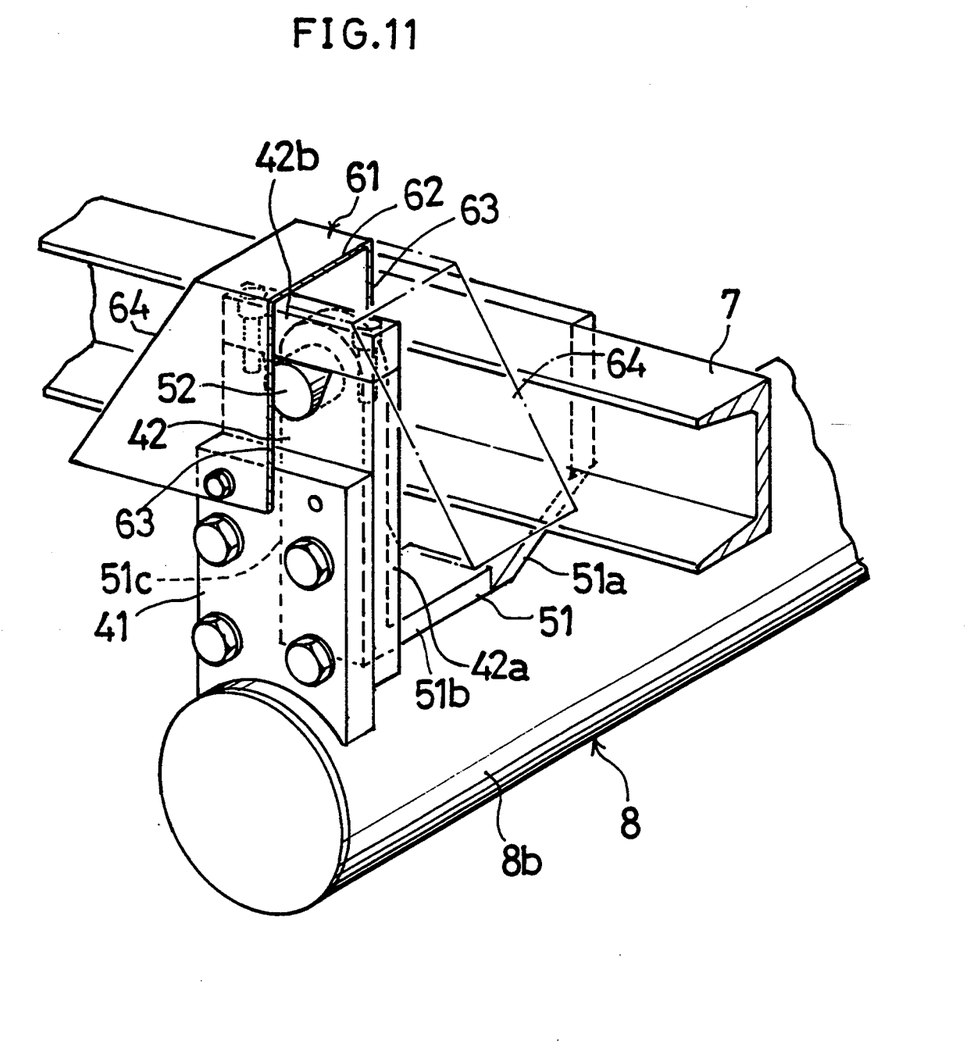
FIG. 11 is a perspective view showing on an enlarged scale a portion of FIG. 9, i.e., an assembly including a support pivot, bearing and air-retaining cover.
Figure 12:
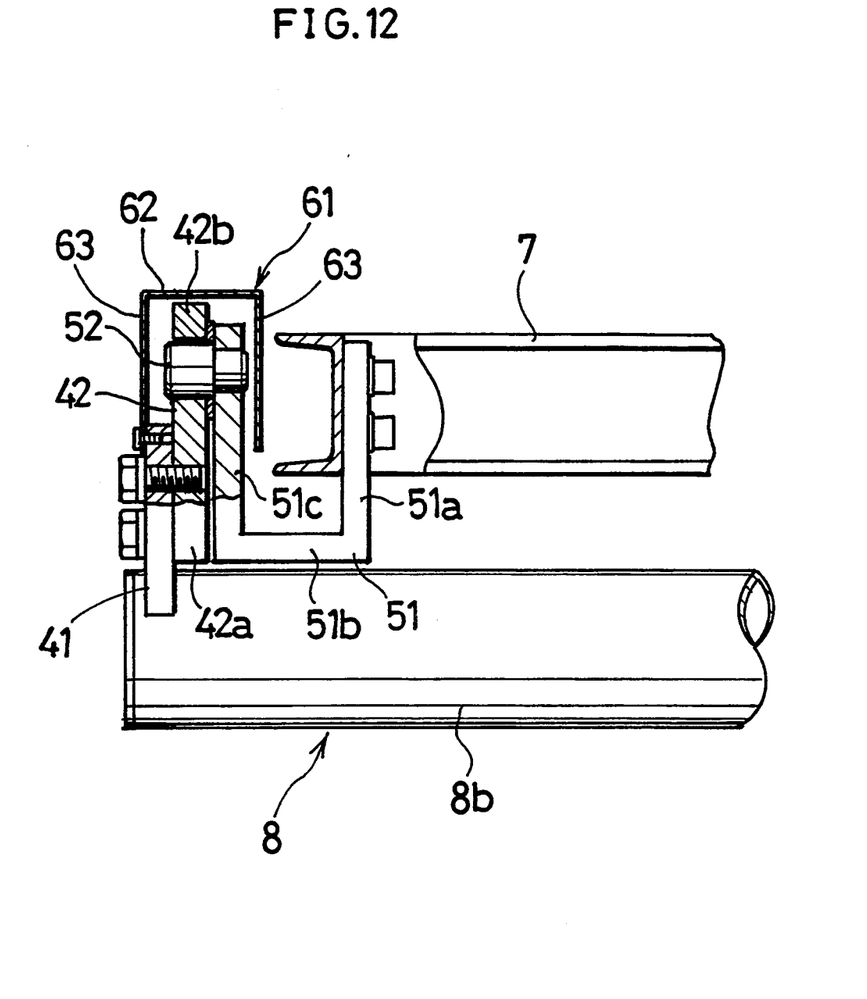
FIG. 12 is a view in vertical section of the assembly.

The air-retaining cover 61 is attached to the arm bracket 41. The cover 61, which is generally in the form of a box having an open bottom side, comprises a flat top wall 62, trapezoidal opposite side walls 63 and front and rear side walls 64 which are arranged to form an upwardly tapered shape. The cover 61 is provided over the bearing 42, support pivot 52 and frame bracket 51.

The air-retaining cover 61 acts to render the bearing 42, the support pivot 52, etc. free from extraneous matter falling from above.

Figure 13:
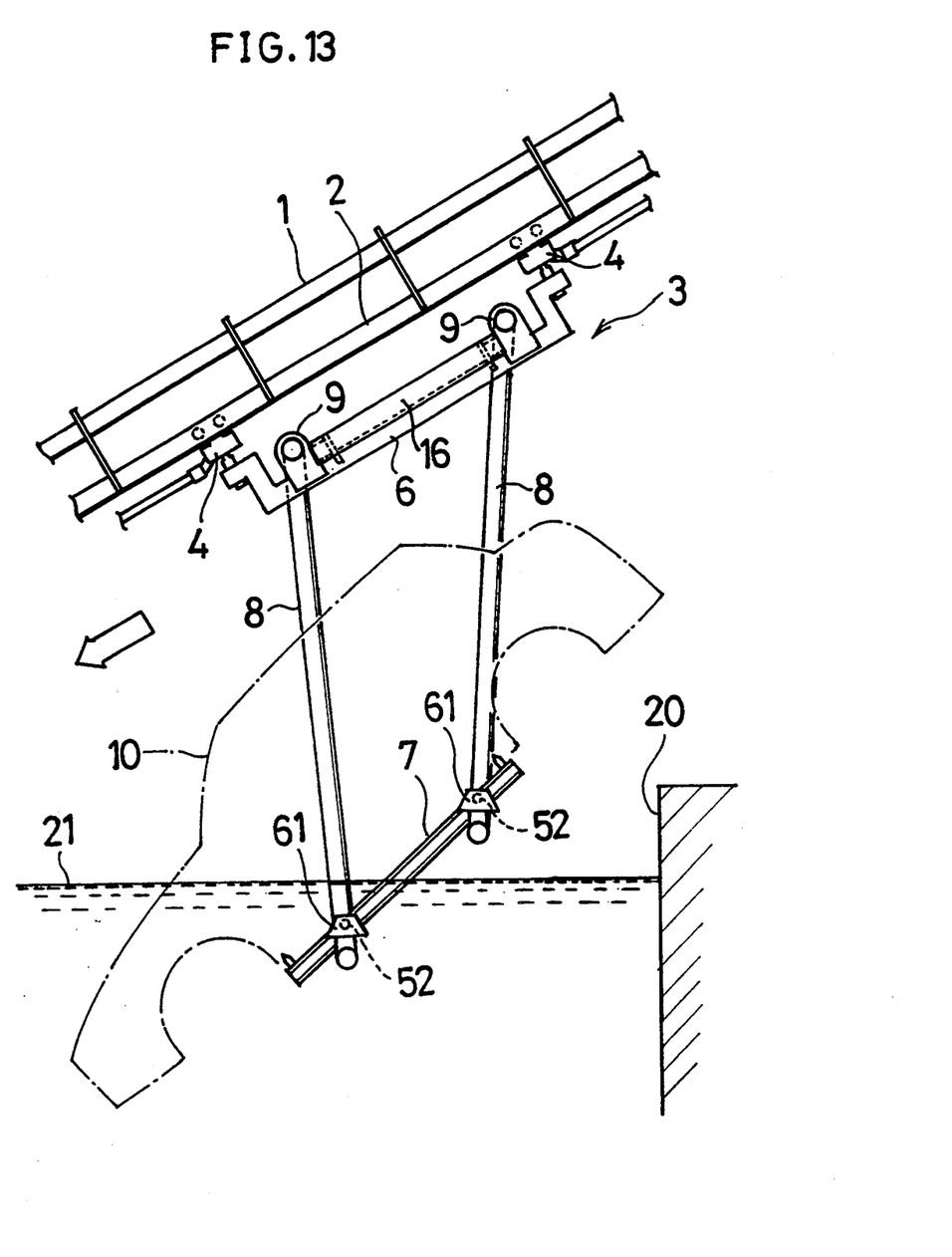
FIG. 13 is a side elevation showing a vehicle body while it is being guided into the bath of an electrodeposition tank during transport in a coating process with use of the hanger-equipped trolley conveyor of fourth embodiment.

When a vehicle body 10 being transported is guided into the bath 21 of en electrodeposition tank 20, the lower frame 7 is inclined, whereas the arms 8, 8 almost remain unchanged in their posture. The cover 61 therefore remains erected without changing its posture. Even when placed into the bath 21, the cover 61 retains air inside thereof, consequently rendering the bearing 42, support pivot 52, etc. unexposed to the liquid. Accordingly, an oil film or the like between the bearing 42 and the pivot 52 remains unbroken, permitting the bearing portion to act smoothly, while the electrodeposition bath remains free of contamination with the lubricant applied to the bearing portion.

Figure 14:
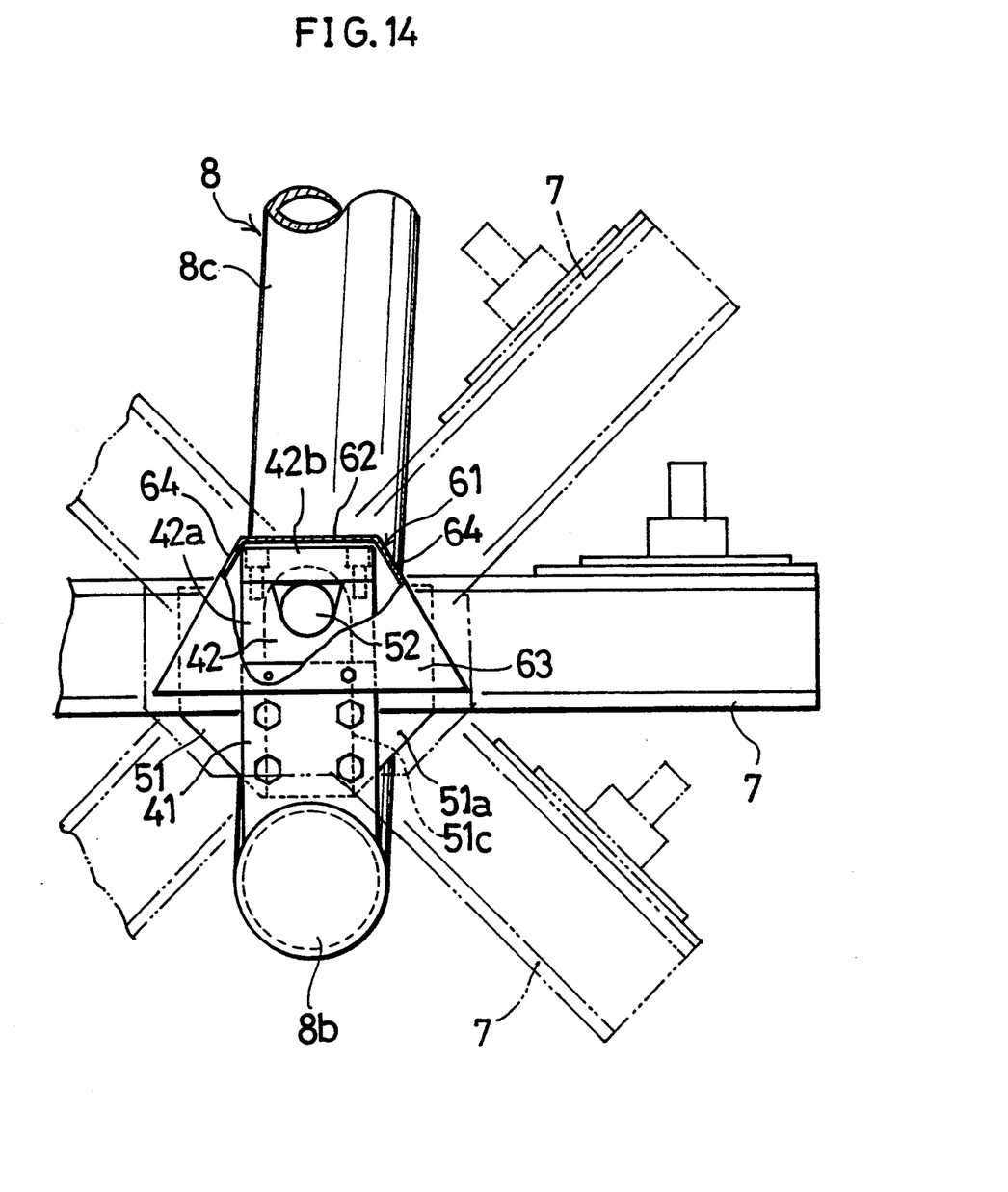
FIG. 14 is an enlarged fragmentary side elevation partly broken away and showing the relationship between a generally U-shaped bracket attached to an article carrying lower frame and the air-retaining cover.

With reference to FIG. 14, the front and rear side walls 64, 64 of the cover 61 are arranged in an upwardly tapered shape as stated above, with the lower ends of these side walls 64, 64 spaced apart by a large distance, so that even if each arm 8 is positioned at an angle, for example, of about 45 degrees, the outer upright portion 51c of the U-shaped bracket 51 attached to the lower frame 7 is unlikely to interfere with the lower end of the front or rear side wall 64 of the cover 61.

Although the hanger 5 of the present invention has been described above as adapted for use in power-and-free overhead trolley conveyors or trolley conveyors having self-propelled carriers according to the foregoing embodiments, the hanger 5 of the invention is usable not only for these trolley conveyors but also for various other conveyors.

What is claimed is:

1. A hanger for use in a conveyor, comprising:
   an upper frame suspendable from a trolley,
   a lower frame, said lower frame having means for attaching thereon an article to be transported with the article located over said lower frame between said upper and lower frames,
   a front arm and a rear arm interconnecting the upper and lower frames and inclined towards each other so as to be closer to one another towards the lower ends of the arms,
   the front arm having an upper end pivotally frame, the rear arm having an upper end pivotally connected to the upper frame at a second location on said upper frame, the front arm having a lower end pivotally connected to the lower frame at a first location on said lower frame, the rear arm having a lower end pivotally connected to the lower frame at a second location on said lower frame, said upper frame extending between said upper first and second locations such as to maintain said upper ends of said arms at said first and second locations, respectively, a fixed distance from one another,
   said hanger being capable of being suspended from the trolley in a horizontal state wherein a line between said upper first and second locations extends horizontally,
   whereby said first and second locations on both said upper and lower frames delineate four corners of generally a trapezoid shape which is shorter at its lower side than at its upper side when the upper frame is situated in the horizontal state.

2. A hanger as defined in claim 1, wherein a longitudinal portion of at least the front arm is inclined at an angle of 0.5 to 5 degrees from a direction perpendicular to said line when in the horizontal state.

3. A hanger as defined in claim 2, wherein the longitudinal portion of at least the front arm is inclined at an angle of 1.5 to 4.0 degrees from the direction perpendicular to said line when in the horizontal state.

4. A hanger as defined in claim 1, wherein said generally trapezoid shape is an isosceles trapezoid.

5. A hanger as defined in claim 1, wherein said front arm and said rear arm each have a generally C-shape as seen from a front view of the hanger, an upper portion of each said C-shape including said upper end which is pivotally connected to said upper frame, and a lower portion of each said C-shape including said lower end which is pivotally connected to said lower frame.

6. A hanger as defined in claim 5, wherein said lower portions each extend across an entire width of said lower frame.

7. A hanger as defined in claim 1, wherein said hanger also includes a second front arm on an opposite side of said hanger than said front arm, and wherein said hanger also includes a second rear arm on an opposite side of said hanger than said rear arm, each of said front arms and each of said rear arms being oppositely facing one another and generally C-shape.

8. A hanger as defined in claim 7, wherein an upper portion of each said C-shape arm is pivotally connected to said upper frame, and a lower portion of each said C-shape arm is pivotally connected to said lower frame, said lower portions each extending only partially across a width of said lower frame.

9. An apparatus, comprising:
 (a) a trolley conveyor in a coating line for motor vehicle bodies;
 (b) a hanger for hanging from said trolley conveyor which includes
  an upper frame suspendable from said trolley,
  a lower frame, said lower frame having means for attaching thereon an article to be transported such that the article is located over said lower frame between said upper and lower frames,
  a front arm and a rear arm interconnecting the upper and lower frames and inclined towards each other so as to be closer to one another towards the lower ends of the arms,
  the front arm having an upper end pivotally connected to the upper frame at a first location on said upper frame, the rear arm having an upper end pivotally connected to the upper frame at a second location on said upper frame, the front arm having a lower end pivotally connected to the lower frame at a first location on said lower frame, the rear arm having a lower end pivotally connected to the lower frame at a second location on said upper frame, said upper frame extending between said upper first and second locations so as to maintain said upper ends of said arms at said first and second locations, respectively, a fixed distance from one another,
  whereby said first and second locations on both said upper and lower frames delineate four corners of generally a trapezoid shape which is shorter at its lower side than at its upper side when the upper frame is situated such that a line between said upper first and second locations is in a horizontal state.

10. An apparatus as defined in claim 9, wherein said trolley conveyor further includes a free rail for hanging said hanger which has a forwardly downward slope portion having an angle of 22 to 27 degrees at a portion of the free rail which is capable of corresponding to an outlet of an electrodeposition tank.

11. An apparatus as defined in claim 9, wherein a longitudinal portion of at least the front arm is inclined at an angle of 0.5 to 5 degrees from a direction perpendicular to said line when in the horizontal state, and wherein said apparatus further includes a free rail having a forwardly downward slope portion with an angle of 22 to 27 degrees at a portion of the free rail corresponding to an inlet of an electrodeposition tank and a forwardly upward slope portion with an angle of 22 to 27 degrees at a portion of the free rail corresponding to an outlet of the electrodeposition tank, said means for loading an article being a means for loading a motor vehicle body, the motor vehicle body being guidable into a bath in the tank so as to obliquely plunge thereinto forwardly downward at an angle of 38 to 42 degrees and being obliquely withdrawable from the bath rearwardly upward at an angle of 38 to 42 degrees.

* * * * *